Oct. 13, 1931.     W. H. EVANS     1,827,510
VALVE SEAT REAMER
Filed Nov. 4, 1926
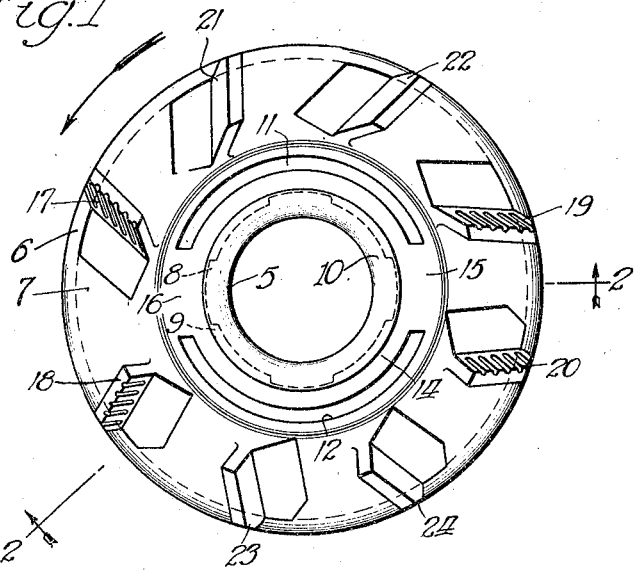
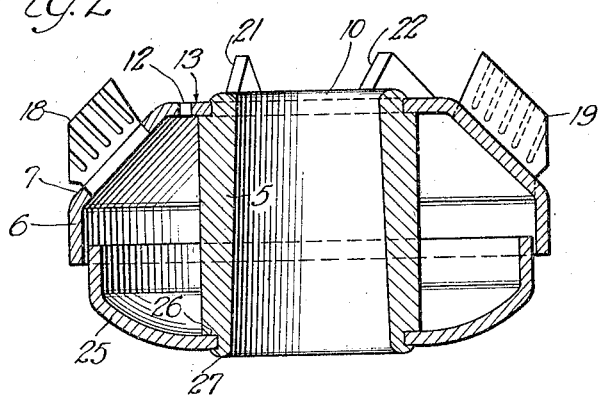
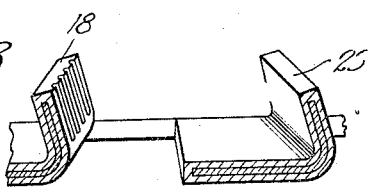
Inventor
Wm. H. Evans
Jabel & Banning Attys.

Patented Oct. 13, 1931

1,827,510

UNITED STATES PATENT OFFICE

WILLIAM H. EVANS, OF CHICAGO, ILLINOIS, ASSIGNOR TO EVANS FLEXIBLE REAMER CORPORATION, OF CHICAGO, ILLINOIS, A CORPORATION OF ILLINOIS

VALVE SEAT REAMER

Application filed November 4, 1926. Serial No. 146,258.

My invention relates to reaming tools, and more particularly to a valve-seat reamer for reaming the valve seats of engines.

It is a purpose of my invention to provide a reamer that will not cause chattering, which often seriously damages a valve seat by making deep cuts at one point and a shallow cut at another point, thus leaving an uneven surface.

It is another purpose of my invention to provide a reamer made of a metal stamping which is provided with thin, flexible teeth that may yield slightly when they tend to cut too deeply, and thus move away from the work enough to make a smooth, even cut and prevent chattering or digging. This result is accomplished by inclining the teeth rearwardly from the base to the cutting edge thereof with respect to the direction of rotation of the tool.

Valve seats of internal combustion engines after a period of use become coated with a layer of extremely hard material which is too hard to be cut by the cutting tool of ordinary hardness, and heretofore it has been the practice to remove this coating by the use of an abrasive tool and to then apply the cutting tool to the work. This practice, involving the use of at least two different tools for reaming one valve seat, is slow and expensive. To avoid this practice and produce a single tool that will remove the hard coating and then, without being removed from the valve seat, cut it down so as to leave a smooth even surface, is the principal purpose of this invention.

I will now describe one form which my invention may take by reference to the accompanying drawings. However, I wish it to be distinctly understood that I do not intend to limit myself to the exact details shown and described, but that I intend to avail myself of all such modifications as would come within the scope of the claims.

In the drawings,—

Fig. 1 is a plan view showing the face of my reaming tool and the position of the teeth thereon;

Fig. 2 is a section on the line 2—2 of Fig. 1; and

Fig. 3 is an enlarged section taken through the teeth of the reamer to illustrate the way in which they are pack-hardened.

Referring now in detail to the drawings, the numeral 5 represents a hollow arbor member adapted to receive a handle or shaft for rotating the cutter. Secured to this member 5 is the hollow, sheet-metal, cutter member 6 having a plurality of teeth struck out from the conical portion 7 thereof. This cutting member is also provided with an opening centrally thereof to receive the arbor 5, and this opening is provided with alternate recesses and projections 8 and 9 in which the reduced end portion 10 of the arbor member 5 is adapted to be upset to rigidly secure a cutter member and arbor together. The cutter member is also provided with a pair of diametrically opposite slots 11 and 12 which extend throughout the greater portion of the flat surface 13 of the cutter member, thus leaving between the inner portion 14 and the outer portion of the cutter member a pair of diametrically-opposed connecting sections 15 and 16. The purpose of this structure is to provide a mounting for the cutter member upon the arbor which will permit the tooth-carrying portion of the cutter to yield about the spindle and the portions 15 and 16 so that it may adjust itself to the varying pressures upon the different teeth. This mounting, since it insures a rigid contact and support of the cutter member on the arbor, and also permits the tooth-carrying portion to yield under pressure, provides a very efficient and easily constructed cutting tool.

I will now describe the improved means whereby I am enabled with this cutter to remove the hard scale from the valve seats and also cut down the valve seat with a single tool. The teeth 17, 18, 19 and 20 are arranged adjacent the portions 15 and 16 of the cutter member, and, as will be clearly apparent, there can be practically no yielding of the cutter member due to the pressure of these teeth against the work because of the fact that the portions 15 and 16 directly connect the tooth-carrying part of the cutter member with the arbor.

These teeth are provided with corrugations on the forward faces thereof, which leave on each tooth a number of narrow cutting edges separated by the grooves or corrugations. These teeth, as well as the teeth 21 and 22, 23 and 24, are all bent rearwardly with respect to the direction of rotation so that the cutting edge when striking too great a resistance may be bent slightly backward, and by this bending will yield away from the work to prevent digging and chattering. However, the teeth 21, 22, 23 and 24, being located adjacent the slots 11 and 12, may also cause yielding of the entire member, due to these slots, about the portions 15 and 16.

Now, when the tool is applied to a valve seat having the hard, carbon coating thereon, the teeth 21, 22, 23 and 24, having unbroken cutting edges and being yieldingly mounted, will not dig into this hard surface, but will spring away from the same, and thus protect their cutting edges. While the teeth 17, 18, 19 and 20, due to the corrugations therein have a smaller amount of cutting edge in engagement with the valve seat, and, furthermore, cannot yield about the arbor because of the portions 15 and 16. Therefore the greater pressure will be applied to these teeth, and the narrow cutting edges thereon will strike the hard carbon deposit and crack the same, to thus permit the smooth-faced teeth to cut down into the softer material of the valve seat.

The cutting teeth and the body of the cutting member 6 are pack-hardened after the teeth are struck upward from the member 6 to such an extent as to provide a hard outer surface and leave a soft core throughout the teeth and body of the cutting member, as clearly illustrated in Fig. 3, in substantially the same manner as is disclosed in my co-pending application Serial No. 71,682, filed November 27, 1925. This pack-hardening produces a cutting edge on the teeth that is considerably harder than the ordinary tool steel and is of sufficient hardness to withstand the heavy duty of cutting through the hard carbon deposit on the valve seats. It is necessary that this pack-hardening take place only to such a depth in the material of the cutter member as to leave a soft core therein which is preferably about one-third the entire thickness of the cutter member. The reason for this is that the teeth of the cutter member must be yieldable and the body of the cutter member must also yield to a certain extent. If the pack-hardening were carried on to such an extent as to harden the member throughout its thickness or if carbon tool steel of sufficient hardness to stand up under this work and break the hard deposit on the valve seats were used, the teeth would be brittle and inclined to snap off, instead of give, when they encountered too great a resistance due to their attempt to cut or dig into the valve seat. The soft core in the teeth enables them to spring back and prevents their snapping off, which, of course, greatly increases the life of the teeth, as well as insuring a smooth cut on the valve seat without chattering.

It will also be noted, upon inspection of Fig. 1, that the teeth in the lower half of the figure have the inner edges inclined rearwardly of the outer edges thereof, and that the upper series of teeth have the inner edges thereof inclined forwardly of the outer edges. This structure, as pointed out in my co-pending application above mentioned, also aids in distributing the strain, due to the cutting of the teeth more evenly throughout the cutter member, and also helps to prevent any jumping or chattering of the teeth.

Secured to the rear end of the spindle 5 is a hollow, cup-shaped member 25, which, as is clearly apparent in Fig. 2, is spaced from the cutter member 6 and fits down inside the cutter member to allow yielding without binding between these two members. The member 25 may be secured to the arbor 5 in any suitable manner, such as by providing a shoulder 26 on the member 5 and spinning the projecting edge 27 over so as to hold the member 25 securely thereon.

It is thought that the above description will be sufficient to enable one skilled in the art to clearly understand the construction and operation of my valve-seat reamer, together with the resultant advantages thereof, which are principally the reduction in the number of tools necessary to finish a valve, the provision of a single tool having teeth thereon which will cut away the hard carbon deposit on the valve seat and then smooth up the valve seat to leave a smooth, even face thereon, and the provision of means to prevent chattering of the tool during its cutting operation. These advantages are accomplished by the particular manner in which the cutter member is mounted upon the arbor to make it yielding, the rearward inclination of the teeth from the direction of rotation, the pack-hardening of the teeth and cutter member so as to make them yieldable, the arrangement of the teeth in a plurality of series, and finally the provision of corrugations in the cutting faces of the teeth having the least ability to yield away from the work.

Having thus described my invention, what

I desire to claim and secure by United States Letters Patent is:

1. A device of the character described comprising a support and a cutter member yieldingly mounted thereon, said cutter member being provided with yieldable teeth thereon inclined to the axis of said cutter member, certain of said teeth having grooves intersecting their cutting edges and extending inwardly toward said cutting member along the forward faces of the teeth.

2. A device of the character described comprising a support and a cutter member yieldingly mounted thereon, said cutter member being provided with yieldable teeth thereon having their cutting edges inclined to the axis of said cutter member, certain of said teeth having grooves intersecting their cutting edges and extending inwardly toward said cutting member along the forward faces of the teeth.

3. A device of the character described comprising a support and a cutter member yieldingly mounted thereon, said cutter member being provided with yieldable teeth thereon inclined to the axis of said cutter member, certain of said teeth having grooves intersecting their cutting edges and extending inwardly toward said cutting member, said grooved teeth being arranged in diametrically opposed pairs and other teeth of said cutter being devoid of grooves and arranged between the groups of grooved teeth.

4. A device of the character described comprising a supporting arbor and a yieldable cutter member having a central portion rigidly secured to said supporting arbor and an annular portion secured to said central portion at spaced points, said annular portion having yieldable teeth projecting therefrom, some of said teeth being provided with grooves intersecting their cutting edges.

5. A device of the character described comprising a supporting arbor and a yieldable cutter member having a circular mounting portion rigidly secured to said supporting arbor and an annular portion secured to said circular mounting portion at spaced points, said annular portion having yieldable teeth projecting therefrom, the teeth adjacent said spaced points being provided with grooves intersecting their cutting edges and the other teeth having smooth uninterrupted cutting edges.

6. A device of the character described comprising a supporting arbor and a yieldable cutter member having a central portion rigidly secured to said supporting arbor and an annular portion secured to said central portion at a pair of diametrically spaced points, said annular portion having yieldable teeth projecting therefrom, the teeth adjacent said diametrically spaced points being provided with grooves intersecting their cutting edges and extending inwardly toward said annular portion and the other teeth having smooth uninterrupted cutting edges.

7. A device of the character described, comprising a supporting arbor, a yieldable cutter member having a central portion rigidly secured to the supporting arbor and an annular portion integrally connected to said central portion at fixed points, said annular portion having a beveled tooth carrying portion, a plurality of yieldable teeth upon said beveled portion, certain of said teeth having grooves on their cutting faces.

In witness whereof, I hereunto subscribe my name this 5th day of October, A. D. 1926.

WILLIAM H. EVANS.